US012748578B2

(12) United States Patent
Moyal et al.

(10) Patent No.: US 12,748,578 B2
(45) Date of Patent: Sep. 29, 2026

(54) IDENTIFICATION OF REUSABLE COMPONENTS

(71) Applicant: International Business Machines Corporation, Armonk, NY (US)

(72) Inventors: Shailendra Moyal, Pune (IN); Sarbajit K. Rakshit, Kolkata (IN); Partho Ghosh, Kolkata (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 17/932,146

(22) Filed: Sep. 14, 2022

(65) Prior Publication Data

US 2024/0086255 A1 Mar. 14, 2024

(51) Int. Cl.

*G06F 8/36* (2018.01)
*G06F 8/74* (2018.01)
*G06F 8/75* (2018.01)

(52) U.S. Cl.

CPC .................. *G06F 8/36* (2013.01); *G06F 8/74* (2013.01); *G06F 8/75* (2013.01)

(58) Field of Classification Search

CPC ..................... G06F 8/00–4435; G06F 8/70–76
See application file for complete search history.

(56) References Cited

U.S. PATENT DOCUMENTS

| | | | | |
|---|---|---|---|---|
| 6,536,037 B1 * | 3/2003 | Guheen | G06F 8/71 703/2 |
| 8,452,629 B2 * | 5/2013 | Chaar | G06Q 10/0637 705/7.11 |
| 11,811,681 B1 * | 11/2023 | Kadam | G06N 3/09 |
| 2004/0007121 A1 | 1/2004 | Graves | |
| 2005/0065970 A1 * | 3/2005 | King | G06F 8/34 707/999.102 |

(Continued)

FOREIGN PATENT DOCUMENTS

CA 2497389 A1 8/2006

OTHER PUBLICATIONS

Identifying repeating patterns in IEC 61499 systems using Feature-Based embeddings Markus Unterdechler, Antonio M. Guti'errez, Lisa Sonnleithner, Rick Rabiser, Alois Zoitl IEEE 27th International Conference on Emerging Technologies and Factory Automation (ETFA), Sep. 6, 2022 (Year: 2022).*

(Continued)

*Primary Examiner* — April Y Blair
*Assistant Examiner* — Paul V Mills
(74) *Attorney, Agent, or Firm* — Kelsey M. Skodje

(57) ABSTRACT

A processor may receive application data associated with an application domain architecture. The processor may receive application data associated with an application architecture, wherein the application architecture includes at least one application. The processor may analyze application data for one or more application portions. The processor may identify a level of commonality for each of the one or more application portions. The processor may determine whether the level of commonality of at least two of the one or more (Continued)

application portions exceeds a threshold level. The processor may remove at least one of the at least two of the one or more application portions determined to exceed the threshold level.

20 Claims, 5 Drawing Sheets

(56) References Cited

U.S. PATENT DOCUMENTS

| | | | | |
|---|---|---|---|---|
| 2007/0100784 | A1* | 5/2007 | Arthur | G06F 8/36 |
| 2008/0295109 | A1* | 11/2008 | Huang | G06F 9/541 718/104 |
| 2009/0007097 | A1* | 1/2009 | Hinton | G06F 8/61 717/176 |
| 2009/0138293 | A1 | 5/2009 | Lane | |
| 2009/0210855 | A1* | 8/2009 | Ramanathan | G06F 8/36 717/122 |
| 2012/0159434 | A1* | 6/2012 | Dang | G06F 8/36 717/120 |
| 2012/0233590 | A1* | 9/2012 | Ranganathan | G06F 8/30 717/106 |
| 2014/0005856 | A1* | 1/2014 | Farnsworth | G05B 19/0426 701/1 |
| 2020/0065225 | A1* | 2/2020 | Marascu | G06F 11/3616 |
| 2020/0125340 | A1 | 4/2020 | Hoover | |
| 2020/0301702 | A1* | 9/2020 | Singh | G06F 8/73 |

OTHER PUBLICATIONS

Removing Clones from the Code Richard Fanta and Vaclav Rajlich (Year: 1999).*

Cafe: A Generic Configurable Customizable Composite Cloud Application Framework Ralph Mietzner, Tobias Unger, and Frank Leymann (Year: 2009).*

Recommender system for software project planning one application of revised CBR algorithm Heng-Li Yang, Cheng-Su Wang (Year: 2008).*

Disclosed Anonymously, "System for real-time recommendation of reusable architectural/ design assets", An IP.com Prior Art Database Technical Disclosure, IP.com No. IPCOM000220540D, IP.com Electronic Publication Date: August 06, 201, 3 pages, <https://priorart.ip.com/IPCOM/000220540>.

Mell, et al., "The NIST Definition of Cloud Computing", National Institute of Standards and Technology, Special Publication 800-145, Sep. 2011, 7 pages.

Subedha, et al., "Design of a Conceptual Reference Framework for Reusable Software Components based on Context Level", IJCSI International Journal of Computer Science Issues, vol. 9, Issue 1, No. 3, Jan. 2012, pp. 26-31, <https://www.researchgate.net/publication/267205538_Design_of_a_Conceptual_Reference_Framework_for_Reusable_Software_Components_based_on_Context_Level>.

* cited by examiner

IDENTIFICATION OF REUSABLE COMPONENTS

BACKGROUND

Aspects of the present disclosure relate generally to the field of application architecture, and more particularly to managing application architecture.

Applications often have reference architectural documents. Reference architectural documents are often sets of documents that provide recommended structures within the application and provide information and guidance regarding how IT (information technology) products and services may be integrated to form various solutions. In many situations, reference architecture documents also include accepted industry best practices, such as those practices associated with optimal delivery methods of specific technology.

SUMMARY

Embodiments of the present disclosure include a method, computer program product, and system for optimizing application architecture.

A processor may receive application data associated with an application domain architecture. The processor may receive application data associated with an application architecture, wherein the application architecture includes at least one application. The processor may analyze application data for one or more application portions. The processor may identify a level of commonality for each of the one or more application portions. The processor may determine whether the level of commonality of at least two of the one or more application portions exceeds a threshold level. The processor may remove at least one of the at least two of the one or more application portions determined to exceed the threshold level.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
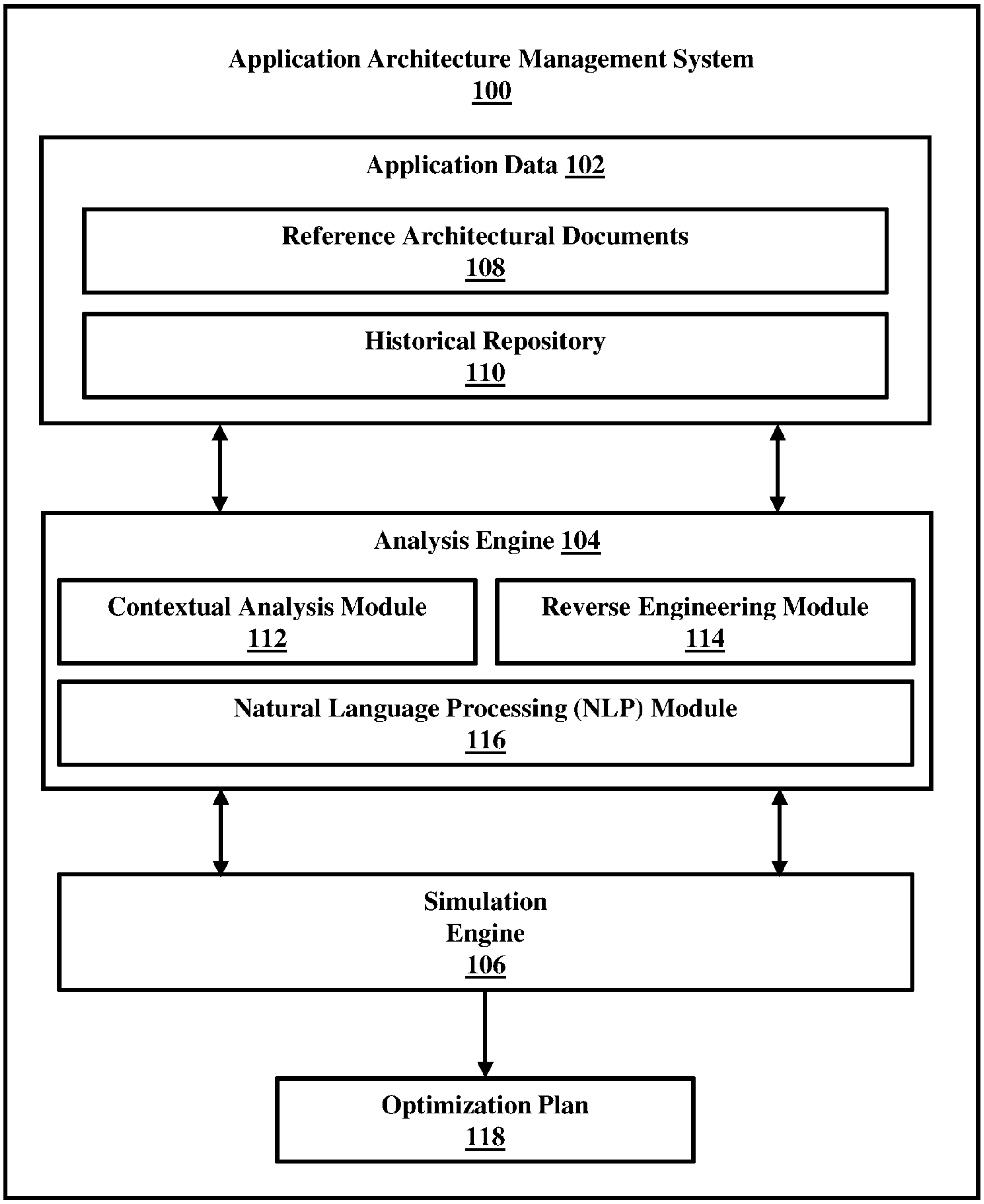
FIG. 1 illustrates a block diagram of an example application architecture management system, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of application architecture, and more particularly to managing application architecture. While the present disclosure is not necessarily limited to such applications, various aspects of the disclosure may be appreciated through a discussion of various examples using this context.

Applications are often developed based on reference architectural documents. In some situations where multiple applications are being developed (e.g., business domains) there are often application architectures that have common features. This commonality is reflected in each application architecture's associated reference architecture document. Reference architectural documents often include information that provides recommended structures within the application. In some situations, application architecture documents also provide information and guidance regarding how IT (information technology) products and services may be integrated to form various solutions. In many situations, reference architecture documents also include accepted industry best practices, such as those practices associated with optimal delivery methods of specific technology.

In some circumstances, such as during application developmental activities, these application architectural commonalities are unnecessarily duplicated resulting in inefficient and redundant use of architecture components or portions of code (e.g., one or more application portions). As such, a solution is desired for managing application architecture and identifying which architecture components or portions of code may be reused, or implemented during future developmental activities.

Before turning to the FIGs. it is noted that the benefits/novelties and intricacies of the proposed solution are that:

The application architecture management system may be configured to identify which portion of any reference architectural documents are common with one or more reference architecture documents. The application architecture management system may be configured to recommend which portion or portions of code associated with the application architecture may be reused while multiple applications are or business domain is under development.

The application architecture management system may be configured to consider the respective reference architectural documents and generate various recommendations. The recommendations may include how the application development or deployment may be optimized (e.g., minimized completion time). For example, the application architecture management system may be configured to identify an efficient/optimized sequence of development that allows for reusable portions of application architecture to be utilized while minimizing unnecessary duplication.

The application architecture management system may be configured to perform reference engineering of various already deployed applications, using reference architectural documents, to recommend if the already developed code can be reused for other new applications that are under development.

The application architecture management system may be configured to allow a user (e.g., a developer) to copy one or more portions from any given reference architectural document. The application architecture management system may then enable the user to paste the same in another reference architectural document. In some embodiments, the mapped code may be copied from the given reference architecture document. This allows the reference architectural document-based development becomes more easily accessible and user friendly.

In embodiments where multiple applications are to be developed, the application architecture management system may be configured use the reference architectural documents to generate a development plan. The application architecture management system may base the development plan on the reusability of various architecture portions and/or portions of code and, if applicable, business priorities.

Referring now to FIG. 1, illustrated is a block diagram of an example object disassembly system 100 for managing application architecture, in accordance with aspects of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

As depicted in FIG. 1, application architecture management system 100 may be configured to manage and optimize application architectures, particularly those application architectures associated with multiple applications or business domains. Application architecture management system 100 may be configured to include application data 102, analysis engine 104, and simulation engine 106. Application architecture management system 100 may include one or more applications or other software architectural units.

In embodiments, application architecture management system 100 may be configured to receive application data 102. Application data 102 may include any information associated with the one or more applications and/or use of the application. The one or more applications managed by application architecture management system 100 may have one or more application portions. These one or more application portions may refer to any sub-application component or portion of code. In embodiments contemplated herein application data 102 may include, but is not limited to: i) information/data associated with reference architectural documents 108 (e.g., information associated with industry best practices for the technology, detailed architectural implementations, types of cloud resources required, how those resources are connected, etc.); ii) information/data associated with various application portions (e.g., functions of each application portion and how the application portions interact/communicate with other application portions); iii); information/data generated from various analyses and/or simulations contemplated herein (e.g., information/data generated by AI and machine learning analysis via simulation engine 106 (e.g., Natural Language Processing (NLP) module 116); iv) information/data associated with databases having information/data associated with application architecture of the same or similar applications; v) information/data associated with associated business priorities (e.g., what application functions are important to the users); vi) information/data associated with real-time information associated with the application(s) usage; vii) information/data associated with historical repository 110; viii) and/or any combination thereof.

In embodiments, application architecture management system 100 may be configured to store application data 102 collected over time in a historical repository 110. Historical repository 110 may be configured to store any application data 102 contemplated herein. In embodiments, application architecture management system 100 may access the historical repository 110 to generate one or more analyses and/or simulations using AI and machine learning capabilities (e.g., via analysis engine 104 and/or simulation engine 106). The information used and generated from these analyses or simulations may be considered application data 102 and may also be stored within the historical repository 110.

In embodiments, application architecture management system 100 may be configured to analyze application data 102 using analysis engine 104 (e.g., enabled with AI and machine learning technology). Analysis engine 104 may include contextual analysis module 112, reverse engineering module 114, and/or NLP module 116. In embodiments, application architecture management system 100 may analyze application data 102 for one or more application portions associated with an application's architecture. While embodiments contemplated herein may often refer to a single application, such embodiments are utilized for brevity and to maintain clarity. As such, though these embodiments refer to a single application or application architecture, any number of applications or application architecture may be used. In embodiments, an application portion may refer to any sub architectural component or portion of code that may or may not be able to perform some application function.

In embodiments, application architecture management system 100 may be configured to analyze each of the one or more application portions identified using analysis engine 104. In some embodiments, application architecture management system 100 may be configured use contextual analysis module 112 and/or NLP module 116 (e.g., via analysis module 104) to analyze the one or more reference architectural documents 108 (e.g., application data 102). Analyzing such forms of application data 102 allows application architecture management system 100 to identify not only the various application portions of each application of interest, but in some embodiments, to identify the various functions or partial functions each of the application portions may provide. As contemplated herein, embodiments with multiple applications are often configured with applications that require similar application portions that each carry out similar functions for their respective application. In some embodiments, application architecture management system 100 may analyze the reference architectural documents 108 for data/information that allows application architecture management system 100 to identify these application portions and/or functions of each of the application portions. For example, application architecture management system 100 may analyze reference architectural documents 108 using contextual analysis module 112 for one or more images that may be reference architectural diagrams (e.g., icons, flowcharts, data tables, etc.). In these embodiments, application architecture management system 100 may identify the various relevant contextual meanings of the reference architectural diagrams. For example, analysis engine 104 may identify the contextual meaning of a particular diagram, the flow direction of a flowchart, and/or various textual analysis associated with the image (e.g., using NLP module 116).

In embodiments where there are more than one application (e.g., any business domain with multiple applications), application architecture management system 100 may be configured to identifying the level or degree of commonality for each of the one or more application portions. Application architectures often have similar application portions that perform similar functions. As contemplated herein, in situations where there are multiple applications there are often redundancy issues that may affect the efficiency of the various applications, particularly when updating or developing/deploying new application into the application architecture. These redundancy issues result from having duplicates or multiples of various application portions. In embodiments, because of the similarities of the application portions among multiple applications, only one application portion (e.g., an application portion previously only associated with a single application architecture) may be needed to perform the same or similar functions of all of the applications in a multiple application setting. In some embodiments, application architecture management system 100 may use analysis engine 104 to analyze application data 102 in order to map the various functions (e.g., business functions) associated with the application and/or application portions.

The level of commonality may refer to how similar each of the application portions are to the other application portions within a multiple application setting. In embodiments, similarity may be measured by the ability of one application portion associated with one application's architecture to perform the same function or similar function (e.g., business function and/or business requirements) as another application portion associated with a different application's architecture. In one example embodiment where a business domain (e.g., with multiple applications) is undergoing an update to include a new application, application architecture management system 100 may identify which of the application portions already in use may be reused (e.g., to perform the same or similar functions) when deploying the new application. In embodiments, application architecture management system 100 may determine the level of commonality of a particular application portion to another application portion using reference architectural documents 108 (e.g., application data 102). In some embodiments, analysis engine 104 may use contextual analysis module 112 to analyze application data to allow application architecture management system 100 to identify which of the application portion (e.g., portion of code) can be reused.

In some embodiments, application architecture management system 100 may be configured to further identify the level or degree of commonality of the application portions by analyzing application data 102 and generating a knowledge corpus (e.g., using NLP Module). In one example embodiment, application architecture management system 100 may analyze the reference architectural documents 108 to determine the various implementations and/or business functionalities, and develop and understanding of how the various applications or application portions may be developed (e.g., using one or more simulations generated via simulation engine 106). In these embodiments, application architecture management system 100 may build a knowledge corpus of the implementations, development strategies, and functionalities. This knowledge corpus may be stored in the historical repository 110 or another database (e.g., a reference architectural document library) application architecture management system 100 may access when needed.

In some embodiments, application architecture management system 100 may be configured to analyze application data 102 using revere engineering module 114. Application architecture management system 100 may be configured to reverse engineer the associated reference architectural documents 108 using reverse engineering module 114 by identifying each of the functions associated with the application's architecture of a particular application and generating the reference architectural document to reflect each of those functions and how they are associated to the various application portions of the application's architecture. In some embodiments, application architecture management system 100 may be configured to collect/receive application data 102 associated with one or more applications that are missing some component or all of the reference architectural documents 108 associated with each application. Using this application data 102, application architecture management system 100 may be configured to reverse engineer the reference architectural documents 108 (e.g., using reverse engineering module 114) to reflect the current status of the applications and their development. In some embodiments, application architecture management system 100 may be configured to use revere engineering module 114 of previously deployed applications with a newly developed application to reflect the various functions and implementations all of the applications (e.g., previously deployed applications and newly developed applications).

As contemplated herein, in embodiments, application architecture management system 100 may be configured to identify the level of commonality of the one or more application portions to other application portions. In these embodiments, a low level or degree of commonality may indicate that two or more application portions do not share a common or similar function, implementation, and/or business requirement. A high level or degree of commonality between the two or more application portions may indicate that the application portions have a common function (e.g., same or similar implementations, and/or business requirements). In some embodiments, analysis engine 104 may be configured to identify the level of commonality of the application portions analyzed from the application data 102 using contextual analysis module 112, reverse engineering module 114 (e.g., by reverse engineering reference architectural documents 108), and/or NLP module 116. For example, using a generated knowledge corpus, application architecture management system 100 may determine how similar the functions of different application portions are to other application portions (e.g., level of commonality).

In embodiments, application architecture management system 100 may be configured to determine whether the level of commonality of the one or more application portions exceeds a threshold level. The threshold level indicates the level of commonality between two or more applications portions is high enough that each of the application portions may be used interchangeably. For example, the threshold level may be exceeded when two similar application portions of the one or more application portions are determined to perform the same and/or similar functions, implementation, and/or business requirement and as a result are determined to have a high level/degree of commonality. Exceeding the threshold level indicates to application architecture management system 100 that one of the application portions (e.g., of the two or more application portions determined to exceed the threshold level) may be used to perform the same or similar functions, implementations, and/or business requirements for all of the application architectures in a multiple application setting. As such, application architecture management system 100 may be configured to reuse at least one application portion of the at least two similar application portions that have been determined to exceed the threshold level to perform the same or similar functions.

In some embodiments, application architecture management system 100 may be configured to generate one or more simulations with the application data using simulation engine 106. While FIG. 1 depicts simulation engine 106 separate from analysis engine 104, in some embodiments, simulation engine 106 may be configured as a component of analysis engine 104. In some embodiments, the one or more simulations generated may be representations of the application architecture. In some embodiments, application architecture management system 100 may be configured use simulation engine 106 to identify the level of commonality associated with each application portion and determine whether the level of commonality between two or more application portions exceeds a threshold level. In these embodiments, application architecture management system 100 may generate one or more simulations using application data 102 collected from reference architectural documents 108 and/or the historical repository 110. The generated simulations may be used to test the functions/implementations/business requirements associated with various application portions to determine whether the application portions have a high level of commonality, a low level of commonality, and if the level of commonality exceeds a threshold level.

In embodiments, application architecture management system 100 may be configured to generate an optimization plan 118. While in some embodiments application architecture management system 100 may generate optimization plan 118 analysis engine 104 (e.g., contextual analysis module 112, reverse engineering module 114, NLP module 116), in other embodiments application architecture management system 100 may generate optimization plan 118 using the one or more simulations provided by simulation engine 106. The optimization plan 118 may include one or more recommendations associated with making the application architecture (e.g., all of the application architecture associated with a multiple architecture setting) more efficient (e.g., optimized and simplified architecture structure). In some embodiments, the one or more recommendations may include, but are not limited to information associated the level of commonality among the various application portions and/or what application portions exceed a threshold level (e.g., what application portions may be reused to optimize the application/multi-application architecture).

In some embodiments, the optimization plan 118 may also include one or more recommendations associated with an appropriate development sequence. Such embodiments enable application architecture management system 100 to ensure that when multiple applications are deployed, each application may be deployed in a particular order that ensures the aggregate development activities and associated development time are minimalized. The appropriate development sequence may be determined by removing the duplicative application portions (e.g., allowing at least one application portion exceeding a threshold level to perform the necessary function), identifying a ranking of the architectural portions (e.g., ranking the commonality among the reference architectural documents 108). In some embodiments, application architecture management system 100 may be configured to identify one or more business requirements associated with how the application architecture should be developed. Optimization report 118 may be configured to provide one or more recommendations associated with how these business requirements may be developed based on the reference architectural documents 108.

In some embodiments, application architecture management system 100 may automatically deploy the application optimization plan 118 to the application architecture. For example, in embodiments where a user is incorporate multiple applications and optimization plan 118 includes a recommended sequence in which the applications should be deployed, application architecture management system 100 may be configured to automatically deploy each application in the order identified by the recommended sequence.

In some embodiments, application architecture management system 100 may be configured to use the one or more simulations to identify whether the one or more applications are missing one or more missing application portions from the application architecture. In these embodiments, application architecture management system 100 may use the simulations to determine that a needed function of the one or more applications is not being supported by the application architecture or a particular application portion. In these embodiments, this function may be identified and supplied to a user or administrator to identify the issue prior to the one or more applications being deployed. In some embodiments, whether the application architecture is missing one or more application portions may also be outputted in the optimization plan 118.

In some embodiments, application architecture management system 100 may be configured to remove one or more of the identified application portions exceeding the threshold level. In these embodiments, application architecture management system 100 may be configured to leave (e.g., or deploy) at least one of the identified application portions (e.g., application portions that exceed the threshold level) that is capable of being reused in the application architecture to perform the same or similar functions as the other application portions identified to exceed the particular threshold. In some embodiments, application architecture management system 100 may be configured to automatically remove at least one of the at least two similar application portions that exceed the threshold level.

In some embodiments, application architecture management system 100 may be configured to identify a new application architecture that may include one or more new application portions. For example, a new application architecture or application may be introduced to an already established multiple application architecture. In these embodiments, the application architecture management system 100 may identify the level of commonality between the one or more application portions and the one or more new application portions. Application architecture management system 100 may then use this level of commonality to determine whether the level of commonality of the one or more application portions and the one or more new application portions activates the threshold level.

In embodiments, application architecture management system 100 may then determine, based on the threshold level which of the one or more new application portions may be removed/unused because a similar function is already provided by one or more application portions of the already existing architecture. In some embodiments, this new application portion identified to be removed/unused would not be included while deploying this new application. In some embodiments, application architecture management system 100 may be configured to analyze one or more reference architectural documents associated with the application architecture to identify and collect application data 102. In some embodiments, application architecture management system 100 may automatically update the one or more reference architectural documents, responsive to removing (e.g., or not using) the one or more application portions determined to activate the threshold level.

Figure 2:
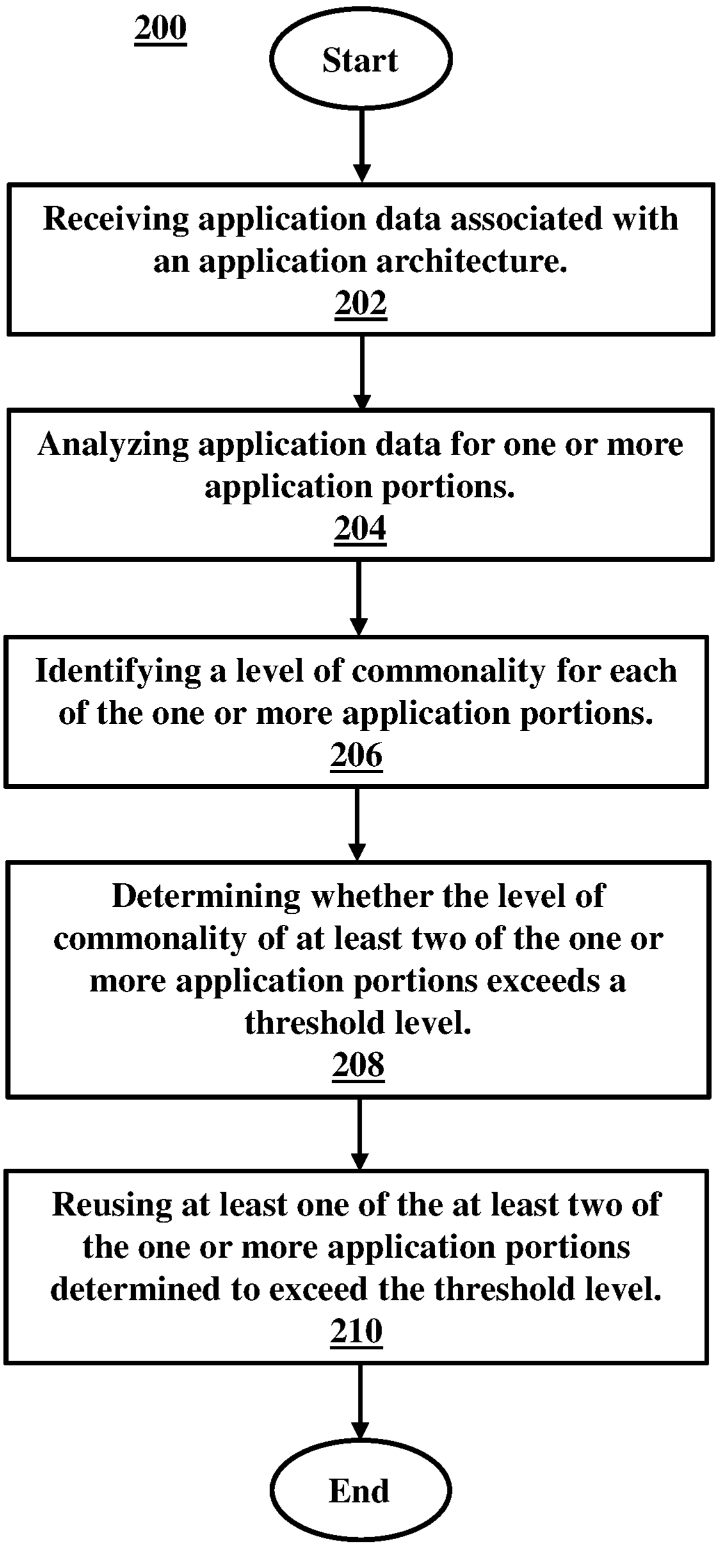
FIG. 2 illustrates a flowchart of an example method for managing application architecture, in accordance with aspects of the present disclosure.

Referring now to FIG. 2, a flowchart illustrating an example method 200 for managing application architecture, in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive application data associated with an application architecture. The application architecture may include at least one application. In some embodiments, the method 200 proceeds to operation 204.

At operation 204, a processor may analyze application data for one or more application portions. In some embodiments, the method 200 proceeds to operation 206.

At operation 206, a processor may identify a level of commonality for each of the one or more application portions. In some embodiments, the method 200 may proceed to operation 208.

At operation 208, a processor may determine whether the level of commonality of at least two of the one or more application portions exceeds a threshold level. In some embodiments, the method 200 may proceed to operation 210.

At operation 210, the processor may remove at least one of the at least two of the one or more application portions determined to exceed the threshold level. In some embodiments, as depicted in FIG. 2, after operation 208, the method 200 may end.

In some embodiments, discussed below there are one or more operations of the method 200 not depicted for the sake of brevity and which are discussed throughout this disclosure. Accordingly, in some embodiments, the processor may base the one or more simulations on one or more digital twins of the object.

In some embodiments, the processor may generate an application optimization plan associated with the application architecture. In these embodiments, the application optimization plan includes one or more recommendations. In some embodiments the processor may automatically deploy the application optimization plan to the application architecture.

In some embodiments, a processor may identify a new application architecture. The new application includes one or more new application portions. In these embodiments, the processor may identify the level of commonality between the one or more application portions and the one or more new application portions. The processor may then determine whether the level of commonality of the one or more application portions and the one or more new application portions exceeds the threshold level.

In some embodiments, the processor may analyze one or more reference architectural documents associated with the application architecture to identify the application data. In these embodiments, the processor may automatically update the one or more reference architectural documents. This may be performed in response to the processor removing the one or more application portions determined to activate the threshold level.

In some embodiments where the processor has analyzed the application data for one or more application portions, the processor may also generate one or more simulations using the application data. The one or more simulations are representations of the application architecture.

In some embodiments, the processor may identify one or more missing application portions from the one or more simulations of the application architecture.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
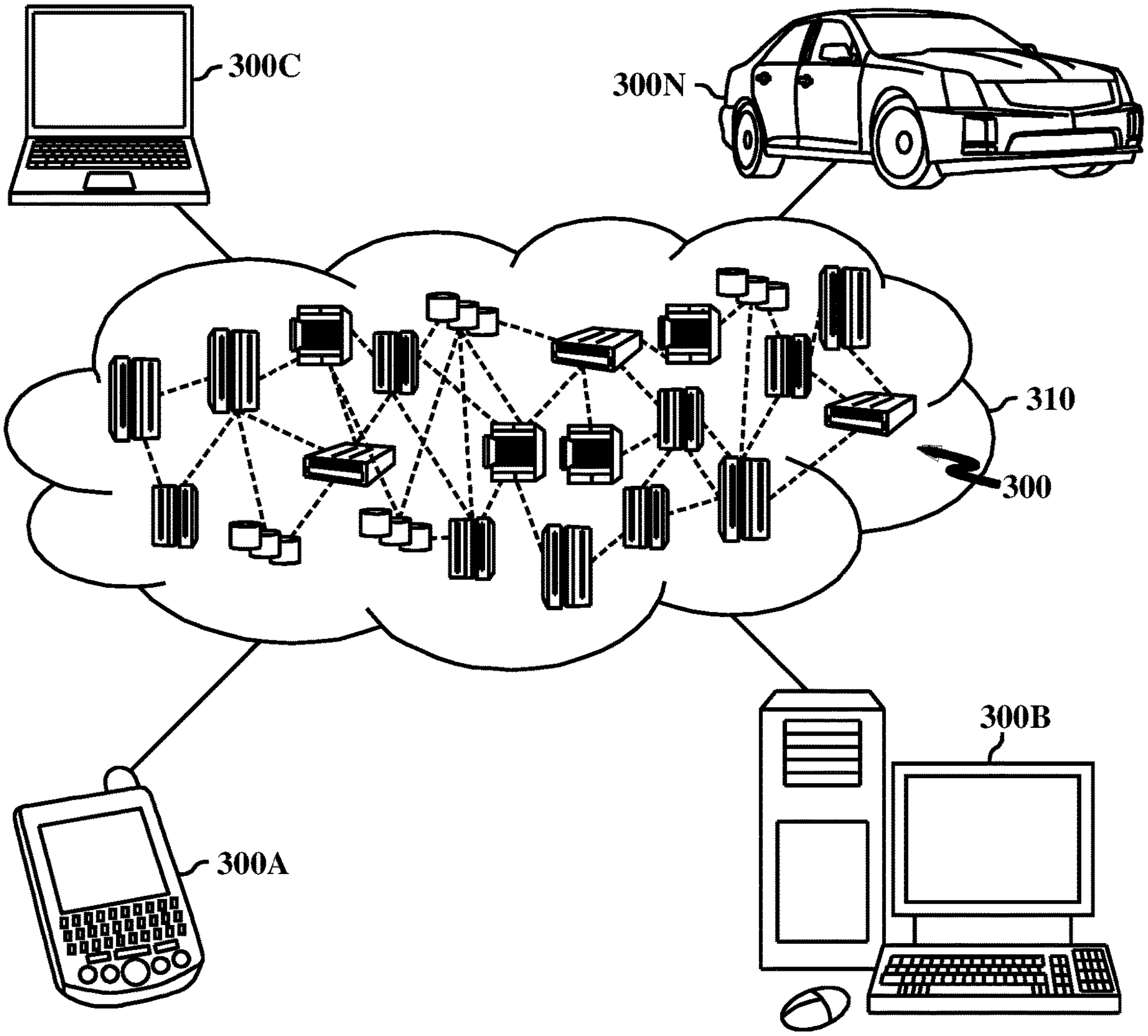
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
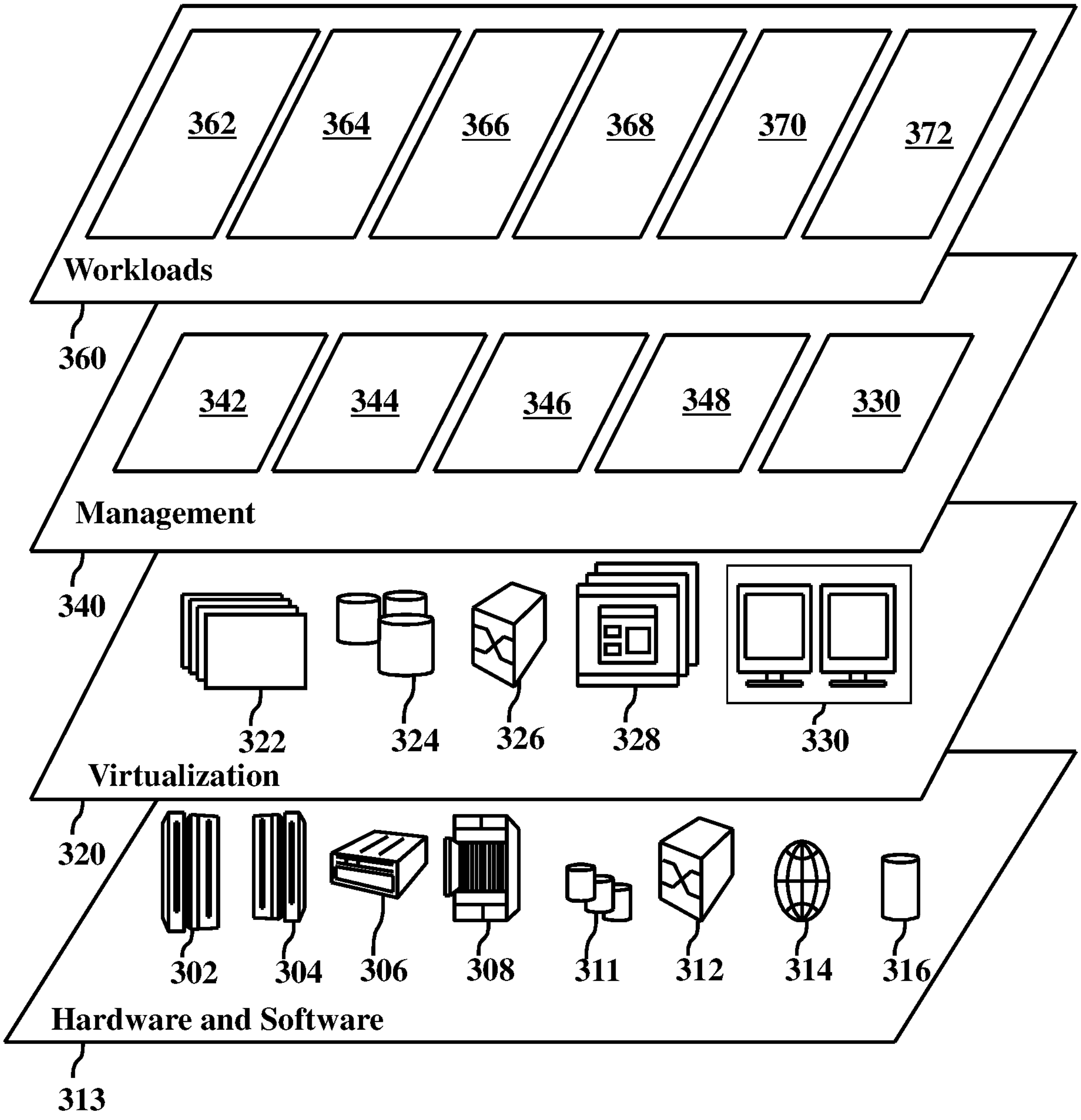
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and architecture managing 372.

Figure 4:
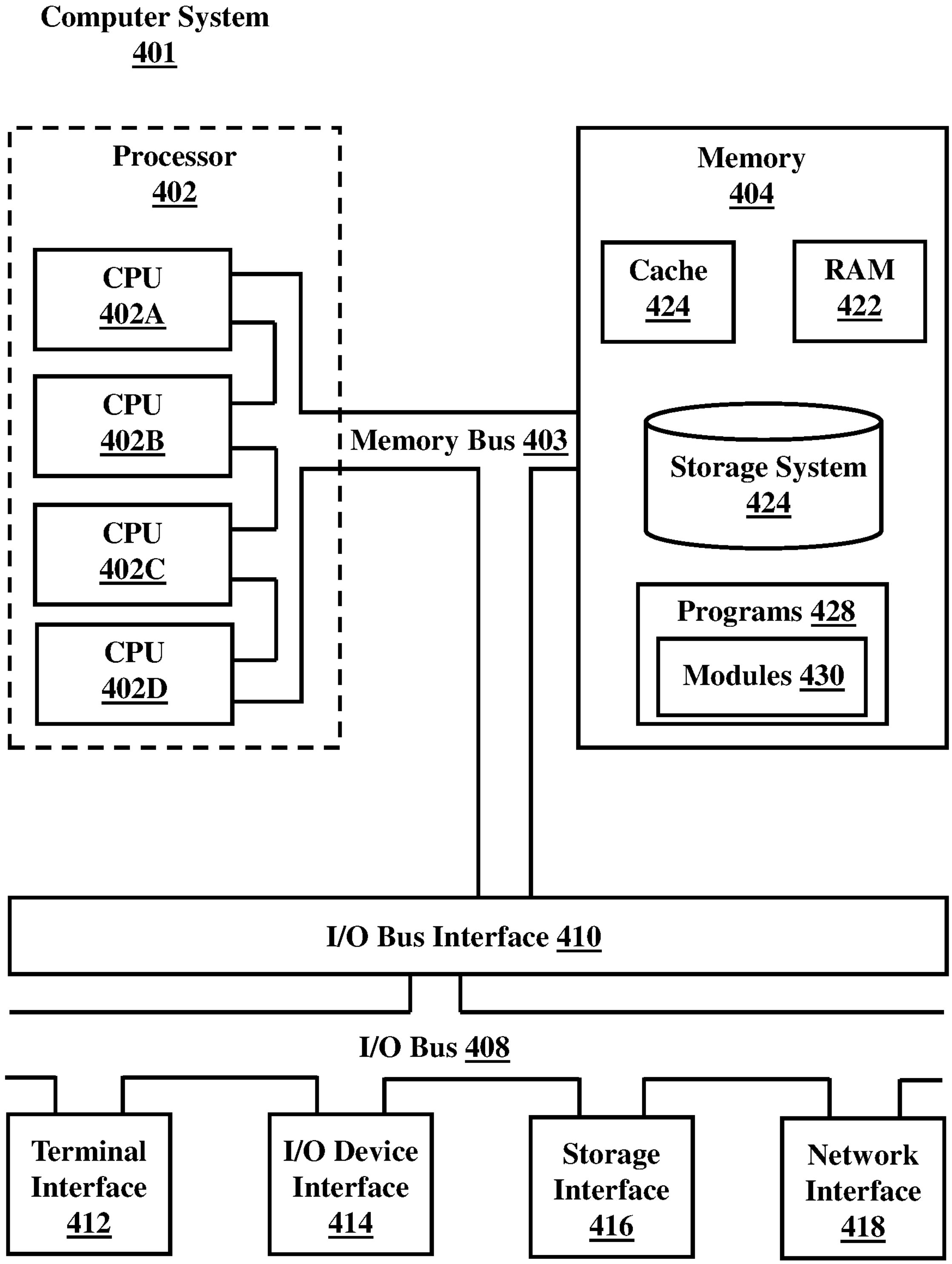
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for managing application architectures, the method comprising:

receiving, by a processor, application data associated with an application architecture, wherein the application architecture includes at least one application in an application domain, wherein the at least one application has a first set of application portions;

analyzing the application data to determine functions of the first set of application portions;

updating a knowledge corpus to include the determined functions of the first set of application portions;

updating the application domain to include a new application having a second set of application portions, wherein the updating comprises:

predicting, based on application data extracted from the new application, functions of the second set of application portions;

identifying, based on a comparison of the determined functions from the knowledge corpus and the predicted functions, levels of commonality for the first and second sets of application portions;

determining that a level of commonality for an application portion from the first set of application portions and an application portion from the second set of application portions exceeds a threshold level; and in response to the determining that the level of commonality exceeds the threshold level, automatically determining a development sequence for the new application that reuses the application portion from the first set; and deploying the new application in the updated application domain, wherein the updated application domain does not include the application portion from the second set of application portions, and wherein the deploying comprises reusing the application portion from the first set of application portions to deploy the new application.

2. The computer-implemented method of claim 1, further comprising:

generating an application optimization plan associated with the application architecture, wherein the application optimization plan includes one or more recommendations.

3. The computer-implemented method of claim 2, including:

automatically deploying the application optimization plan to the application architecture.

4. The computer-implemented method of claim 1, further comprising:

identifying a new application architecture, wherein the new application architecture includes one or more new application portions;

identifying levels of commonality between the first set of application portions and the one or more new application portions; and determining whether a level of commonality from the levels of commonality of the first set of application portions and the one or more new application portions exceeds the threshold level.

5. The computer-implemented method of claim 1, further comprising:

analyzing one or more reference architectural documents associated with the application architecture to identify the application data; and automatically updating the one or more reference architectural documents, responsive to removing the application portion from the second set of application portions.

6. The computer-implemented method of claim 1, wherein analyzing the application data includes:

generating one or more simulations using the application data, wherein the one or more simulations are representations of the application architecture.

7. The computer-implemented method of claim 6, further including:

identifying one or more missing application portions from the one or more simulations of the application architecture.

8. A system for managing application architectures, the system comprising:

a memory; and a processor in communication with the memory, the processor being configured to perform operations comprising:

receiving application data associated with an application architecture, wherein the application architecture includes at least one application in an application domain, wherein the at least one application has a first set of application portions;

analyzing the application data to determine functions of the first set of application portions;

updating a knowledge corpus to include the determined functions of the first set of application portions;

updating the application domain to include a new application having a second set of application portions, wherein the updating comprises:

predicting, based on application data extracted from the new application, functions of the second set of application portions;

identifying, based on a comparison of the determined functions from the knowledge corpus and the predicted functions, levels of commonality for the first and second sets of application portions;

determining that a level of commonality for an application portion from the first set of application portions and an application portion from the second set of application portions exceeds a threshold level; and in response to the determining that the level of commonality exceeds the threshold level, automatically determining a development sequence for the new application that reuses the application portion from the first set; and deploying the new application in the updated application domain, wherein the updated application domain does not include the application portion from the second set of application portions, and wherein the deploying comprises reusing the application portion from the first set of application portions to deploy the new application.

9. The system of claim 8, further comprising:

generating an application optimization plan associated with the application architecture, wherein the application optimization plan includes one or more recommendations.

10. The system of claim 9, including:

automatically deploying the application optimization plan to the application architecture.

11. The system of claim 8, further comprising:

identifying a new application architecture, wherein the new application architecture includes one or more new application portions;

identifying levels of commonality between the first set of application portions and the one or more new application portions; and determining whether a level of commonality from the levels of commonality of the first set of application portions and the one or more new application portions exceeds the threshold level.

12. The system of claim 8, further comprising:

analyzing one or more reference architectural documents associated with the application architecture to identify the application data; and automatically updating the one or more reference architectural documents, responsive to removing the application portion from the second set of application portions.

13. The system of claim 8, wherein analyzing the application data includes:

generating one or more simulations using the application data, wherein the one or more simulations are representations of the application architecture.

14. The system of claim 13, further including:

identifying one or more missing application portions from the one or more simulations of the application architecture.

15. A computer program product for managing application architectures, the computer program product comprising a computer readable storage medium having program instructions embodied therewith, the program instructions executable by a processor to cause the processors to perform a function, the function comprising:

receiving application data associated with an application architecture, wherein the application architecture includes at least one application in an application domain, wherein the at least one application has a first set of application portions;

analyzing the application data to determine functions of the first set of application portions;

updating a knowledge corpus to include the determined functions of the first set of application portions;

updating the application domain to include a new application having a second set of application portions, wherein the updating comprises:

predicting, based on application data extracted from the new application, functions of the second set of application portions;

identifying, based on a comparison of the determined functions from the knowledge corpus and the predicted functions, levels of commonality for the first and second sets of application portions;

determining that a level of commonality for an application portion from the first set of application portions and an application portion from the second set of application portions exceeds a threshold level; and in response to the determining that the level of commonality exceeds the threshold level, automatically determining a development sequence for the new application that reuses the application portion from the first set; and deploying the new application in the updated application domain, wherein the updated application domain does not include the application portion from the second set of application portions, and wherein the deploying comprises reusing the application portion from the first set of application portions to deploy the new application.

16. The computer program product of claim 15, further comprising:

generating an application optimization plan associated with the application architecture, wherein the application optimization plan includes one or more recommendations.

17. The computer program product of claim 16, including:

automatically deploying the application optimization plan to the application architecture.

18. The computer program product of claim 15, further comprising:

identifying a new application architecture, wherein the new application architecture includes one or more new application portions;

identifying levels of commonality between the first set of application portions and the one or more new application portions; and determining whether a level of commonality from the levels of commonality of the first set of application portions and the one or more new application portions exceeds the threshold level.

19. The computer program product of claim 15, further comprising:

analyzing one or more reference architectural documents associated with the application architecture to identify the application data; and automatically updating the one or more reference architectural documents, responsive to removing the application portion from the second set of application portions.

20. The computer program product of claim 15, wherein analyzing the application data includes:

generating one or more simulations using the application data, wherein the one or more simulations are representations of the application architecture.

* * * * *